DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 28, 1972

896 O.G. 1209

T896,054

PLASTICIZERS FOR HYDROXYPROPYL CELLULOSE

William P. Long, Jr., Wilmington, Del., assignor to Atlas Chemical Industries, Inc., Wilmington, Del.

Filed Mar. 12, 1971, Ser. No. 123,876

Int. Cl. C08h *17/34*

U.S. Cl. 106—188

No Drawing. 6 Pages Specification

Extrudable compositions of hydroxypropyl cellulose resins are obtained by the addition of up to 20% by weight of a plasticizer selected from the group of polyol-ethers consisting of polyoxypropylene(10)sorbitol, polyoxypropylene(1)sorbitol, polyoxyethylene(4)phenol, and decaglycerol. Such polyol-ether plasticizers are produced by reacting propylene oxide with sorbitol; ethylene oxide with phenol; and the dehydration of glycerine, respectively. The plasticizers are especially useful in hydroxypropyl cellulose compositions having an average of 2–5 hydroxypropyl groups per anhydroglucose unit. The compositions of the invention have excellent thermoplasticity and are particularly useful in manufacturing cold water-soluble films, coatings, and shapes.